Oct. 11, 1966     A. J. YERMAN     3,277,717

SENSING DEVICE AND ARRANGEMENT

Filed April 22, 1963     9 Sheets-Sheet 1

DIODE CHARACTERISTIC AND TERMINOLOGY

Inventor:
Alexander J. Yerman,
by Charles W. Helzer
His Attorney.

Oct. 11, 1966 A. J. YERMAN 3,277,717
SENSING DEVICE AND ARRANGEMENT
Filed April 22, 1963 9 Sheets-Sheet 2

Inventor:
Alexander J. Yerman,
by Charles W. Helzer
His Attorney.

Oct. 11, 1966  A. J. YERMAN  3,277,717
SENSING DEVICE AND ARRANGEMENT
Filed April 22, 1963  9 Sheets-Sheet 3

Inventor:
Alexander J. Yerman,
by Charles W. Helzer
His Attorney.

Oct. 11, 1966

A. J. YERMAN 3,277,717

SENSING DEVICE AND ARRANGEMENT

Filed April 22, 1963

Inventor:
Alexander J. Yerman,
by Charles W Helzer
His Attorney.

A. J. YERMAN 3,277,717

SENSING DEVICE AND ARRANGEMENT

Filed April 22, 1963

Inventor:
Alexander J. Yerman,
by Charles W. Helzer
His Attorney.

United States Patent Office

3,277,717
Patented Oct. 11, 1966

3,277,717
SENSING DEVICE AND ARRANGEMENT
Alexander J. Yerman, Scotia, N.Y., assignor to General Electric Company, a corporation of New York
Filed Apr. 22, 1963, Ser. No. 274,668
8 Claims. (Cl. 73—362)

The present invention relates to a new and improved sensing and measuring device.

More particularly, the invention relates to a new and improved tunnel diode sensing device, and to an arrangement employing such device for sensing and measuring variations in some physical characteristic.

With the increased effort being expended by both industry and the Government on remote located control and information handling equipment, there has developed an expanded need for improved sensing devices and equipment. For example, with the telemetering equipment employed in rocket and guided missile research, it is often desirable to sense and measure some physical characteristics (such as temperature) and to transmit the information back to a data handling center. If desired, some other physical characteristic such as pressure, force, acceleration, etc. might be sensed and measured. In all such equipments, it is necessary to employ a suitable sensing device for sensing the physical characteristic to be sensed and measured. This sensing device is generally included in a suitable circuit for developing a usable output signal representative of the physical characteristic being measured. The output signal (which desirably is a frequency modulated signal) is then transmitted back to the data handling center, where the information can be utilized. It is desired that the output signal be a frequency modulated signal because such frequency modulated output signal is less susceptible to degradation by transient factors such as background noise, etc.

It is a primary purpose of the present invention to provide a new and improved physical characteristic sensing device and arrangement.

More particularly, the invention provides a new and improved tunnel diode sensing device, and an arrangement employing such device for sensing and measuring variations in some physical characteristic; and for deriving a frequency modulated output signal representative of such variations.

In practicing the invention, a physical characteristic sensing and measuring arrangement is provided which includes a tunnel diode junction device that possesses substantially no hysteresis effects in its operating characteristic. Circuit means are operatively coupled in electrical circuit relationship with the tunnel diode for energizing the same, and physical characteristic sensing means are operatively coupled to the circuit means for varying the operating conditions of the tunnel diode in response to the physical characteristic being sensed. The arrangement is completed by output means which are operatively coupled in electrical circuit relationship with the tunnel diode for deriving an output indication of the variations in response of the tunnel diode to the physical characteristic being sensed. In a particular embodiment of the invention, the tunnel diode junction device itself is fabricated in a manner to expose the junction of the device to the effect of the physical characteristic being sensed. In one particular form of such a tunnel diode device, the device is fabricated from a semiconductor material which forms a junction with a suitable conductor material, the junction exhibiting tunnel diode characteristics. A flexible electrically conductive member is permanently attached to the semiconductor material to provide electrical contact thereto and a slack diaphragm is physically bonded to the flexible electrically conductive member for applying force to the junction.

Other objects, features and many of the attendant advantages of this invention will be better understood when considered in connection with the following drawings, wherein like parts in each of the several figures are identified by the same reference character, and wherein.

Figure 1:
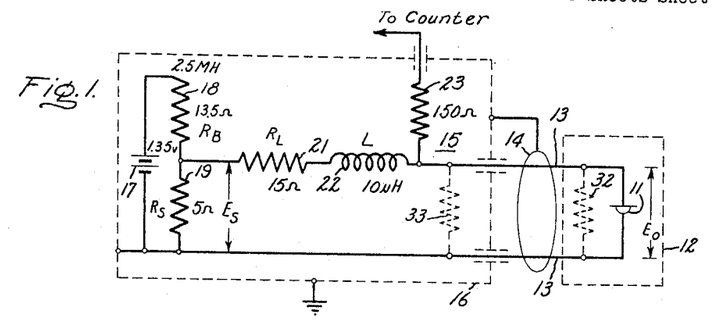
FIGURE 1 is a schematic circuit diagram of a new and improved physical characteristic sensing and measuring arrangement constructed in accordance with the invention.

FIGURE 1 is a schematic circuit diagram of a new and improved physical characteristic sensing and measuring arrangement constructed in accordance with the present invention. This arrangement is comprised by a tunnel diode 11 which is supported in a suitable housing indicated by the dotted outline box 12 for sensing a particular physical characteristic to be measured. For example, if the physical characteristic desired to be measured is temperature, then the housing 12 will have one configuration designed to expose the junction of the tunnel diode 11 to the direct action of the temperature of the environment whose temperature is to be sensed; or if the physical characteristic to be measured is pressure, a different configuration will be employed which would expose the tunnel diode 11 directly to the effects of the pressure to be measured.

The tunnel diode 11 may comprise a commercially available tunnel diode or a specially constructed tunnel diode. The diode material can be germanium, silicon, gallium arsenide or indium antimonide or any other material providing a tunnel diode with desirable or useful characteristics. The base material used may be appropriately doped with a suitable concentration of carrier material to provide either a n or p type semiconductor base material.

The tunnel diode 11 is modified somewhat in its fabrication from conventional tunnel diodes which are commercially available in that it has been adapted to eliminate what is termed as a pseudo-hysteresis effect. This pseudo-hysteresis effect is one which causes the diode to exhibit certain characteristics, on increasing pressure, temperature, etc. and to exhibit different characteristics on decreasing temperature, pressure, etc. As a consequence, if the tunnel diode possesses a pseudo-hysteresis effect, it may exhibit one output current for a given value pressure with increasing pressure, and for the same value of pressure with a decreasing pressure, the tunnel diode exhibits a different output current. Such pseudo-hysteresis effect may be eliminated from the tunnel diode by removing gas from within and around the tunnel diode junction and replacing it with a suitable degassed liquid. Liquids suitable for this purpose include standard kerosense base hydraulic fluids (Welsh vacuum pump oil, silicone oil, or any other fluid compatible with the tunnel diode materials. The liquid may be suitably degassed by passing the same through an evacuated chamber. Following this procedure, the diodes are placed in an evacuated chamber, and the degassed oil is admitted into the chamber until the diodes are completely covered and filled, at which point the vacuum may be broken. Upon the completion of this procedure, the fluid filled diodes are exposed to a very high hydrostatic pressure which operates to drive any gas entrained in the junction or in the oil, into solution in the oil. This prepressurization treatment for example, might be carried out at a pressure of 50 k.p.s.i. (kilopounds per square inch) for a period of 11 hours. Such fluid filling and prepressurization treatment then operates to eliminate the above-mentioned undesired pseudo-hysteresis effect. In the following discussion, unless a contrary situation is indicated, it is presumed that the tunnel diode 11 has been treated in this manner to elimiinate the pseudo-hysteresis effect. Additionally, it might be mentioned that the suitable housing 12 indicated by the dotted box in FIGURE 1 might comprise nothing more than the outer casing of the diode 11 when treated in the above manner where it is possible for the physical characteristic being measured (for example pressure) to act directly on the diode junction through a hole in the case to thereby subject the junction of the diode to the effect of the physical characteristic being measured. The purpose for having the physical characteristic being sensed and measured act directly on the junction of the tunnel diode device 11 will be appreciated more fully hereinafter.

The tunnel diode device 11 is connected through a shielded conductor 13 surrounded by grounded sheath 14 to a relaxation oscillator means 15. The relaxation oscillator means 15 is preferably enclosed within a shielded container indicated by the dotted lines 16 which similarly is grounded. The relaxation oscillator means 15 is formed by a source of bias or energizing potential 17 comprised by a 1.35 volt battery, and a resistance-reactance circuit means. The resistance-reactance circuit means includes a pair of voltage dividing resistors 18 and 19 connected across the source of energizing potential 17 with the junction of the voltage dividing resistors 18 and 19 being connected through a current limiting resistor 21, and a reactance 22, to one terminal of the tunnel diode device 11. In the particular embodiment of the invention illustrated in FIGURE 1, the reactance 22 comprises a 10 microhenry inductance and resistor 21 is the D.C. resistance of the coil. The remaining terminal of the tunnel diode device 11 is connected back to the junction of the resistor 19 and the source of bias or energizing potential 17, which junction may be grounded by being connected to the grounded outer container shell 16. The circuit thus formed will operate as a resistance-inductance relaxation oscillator in a manner to be described in the following paragraph. It is only important to note at this point, however, that the output signal from the relaxation oscillator means 15 is a frequency modulated output signal as will be discussed more fully hereinafter. The frequency modulated output signals from the resistance-reactance relaxation oscillator means 15 may be obtained across the tunnel diode 11 via a suitable isolating resistor 23 connected between the end of the inductance 22 and the tunnel diode device 11, and provides a measure of the frequency of oscillations produced by the relaxation oscillator circuit means 15.

Figure 2:
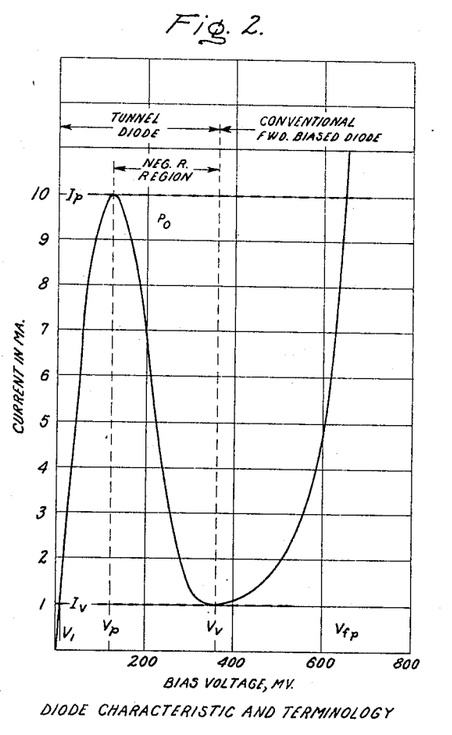
FIGURE 2 is a characteristic curve illustrating the current versus bias voltage characteristic of a typical tunnel diode junction device.

FIGURE 2 of the drawings illustrates the current versus bias voltage characteristic of a conventional commercial tunnel diode device. The modified tunnel diode device 11 employed in the present invention for most purposes will possess a similar current versus bias voltage characteristic. Hence, for the purpose of the present discussion, it is assumed that the characteristic in FIGURE 2 illustrates the current versus bias voltage characteristic of the tunnel diode 11. Upon being placed in operation, the relaxation oscillator means 15 which includes tunnel diode 11 as a part thereof, will function in the following manner.

First assume that the value of series resistance 21 ($R_L$) and the bias voltage are so selected that the D.C. load line intersects the tunnel diode curve at one point only in the negative resistance region. Then whenever the diode voltage is below the point where the load line intersects the diode characteristic, the voltage in the coil 22, is in the direction to increase its current. Similarly, whenever the diode voltage is above this equilibrium point, the current in the coil decreases. When the circuit is first turned on, the current in the diod and coil increase, but when the peak current, $I_p$ of the diode is reached, there is a contradiction. The voltage on the coil is in the direction to increase current, but any increase in the voltage would result in a decrease in the current through the diode. Since the two elements are in series, the current through them must be equal. The circuit resolves this conflict by switching to the high voltage state, i.e. $I_p$ and $V_{fp}$. This switching takes very little time and takes place at essentially constant current. At this point the current through the coil starts to decrease and continues to do so until a similar conflict between coil current and diode current occurs at the valley position $I_v$ and $V_v$, at which point the conflict is resolved by switching to the low voltage state $I_v$, $V_l$ to complete one cycle of oscillation and initiate the next one.

The tunnel diode 11 having the characteristic shown in FIGURE 2 when coupled with a resistance-reactance circuit and energizing source to form a relaxation oscillator means 15 will operate to produce an approximately square wave form output signal having a frequency determined primarily by the characteristics of the tunnel diode 11, the time constant of the resistance-reactance circuit 19, 21, 22 and the value of the bias or energizing potential 17. It should be noted that in an operating cycle, the time required for the tunnel diode 11 to shift from its operating potential $V_p$ to the operating potential $V_{fp}$, and to shift from the operating potential $V_v$ to the operating potential $V_l$, is infinitesimal in comparison to the time required for the current through the diode to increase from the value $I_v$ to the value $I_p$, and thereafter to decrease from the value $I_p$ to the value $I_v$. As a consequence, the operating period of the relaxation oscillator means 15 (and hence its frequency) is dependent almost entirely upon the time required for the current to increase from the value $I_v$ to its peak value $I_p$, and then return from its peak value $I_p$ to its valley current level $I_v$. By causing the operating period, and hence the operating frequency of the relaxation oscillator means 15 to vary in accordance with variations of the physical characteristic being measured, and by properly calibrating the varying frequency output signal obtained from the relaxation oscillator means 15, it is possible to derive an accurate measure of the variations in the physical characteristic desired to be sensed and measured.

As stated above, the frequency and hence operating period of the relaxation oscillator means 15 is determined amongst other things by two critical times as set forth in the following expression:

$$\tau = t_1 + t_2 \quad (1)$$

where:

$t_1$ is the time for the current through the tunnel diode to go from the valley value $I_v$ to its peak value $I_p$;

$t_2$ is the time for the current through the diode to go from its peak value $I_p$ to its valley current level $I_v$; and $\tau$ is the operating period of the relaxation oscillator, and can be converted to a frequency measure by the expression $$f = \frac{1}{\tau}$$

It can be shown both theoretically and experimentally that the critical times $t_1$ and $t_2$ are highly dependent on three possible variables affecting the operation of the tunnel diode junction device 11. These three variables are the pressure acting on the junction of the tunnel diode, the temperature of the junction of the tunnel diode, and the value of the bias or energizing voltage applied to the tunnel diode. The interrelation of these three variables is set forth in the following expressions where:

$$t_1 = \frac{L}{R_L + R_{D1}} \ln \left[ \frac{E_s - (R_L + R_{D1})I_v}{E_s - (R_L + R_{D1})I_p} \right] \quad (2)$$

and:

$$t_2 = \frac{L}{R_L + R_{D2}} \ln \left[ \frac{V_{fp} + I_p R_L - E_s}{\left(\frac{V_{fp} + V_v}{2}\right) + I_v R_L - E_s} \right] \quad (3)$$

It should be noted that in Equations 2 and 3 above, the values $R_{D1}$ and $R_{D2}$ are the linearized resistances of the diode characteristic between the values $0 < V < V_p$ and $V_v < V < V_{fp}$ respectively and are taken as:

$$R_{D1} = \frac{0.75 V_p}{I_p}$$

$$R_{D2} = \frac{V_{fp} - V_v}{2(I_p - I_v)}$$

Figure 3:
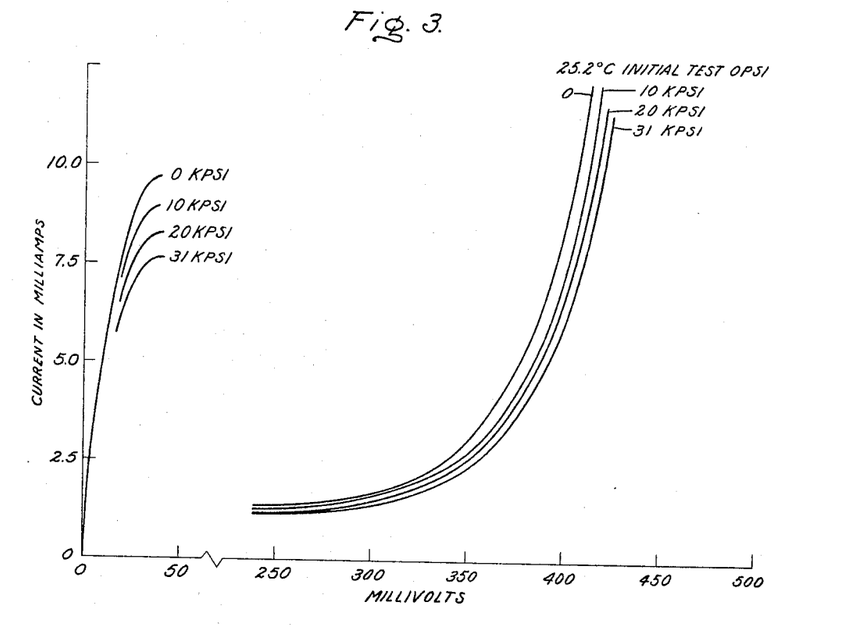
FIGURE 3 is a characteristic curve illustrating a number of current versus bias voltage characteristic curves of a typical tunnel diode junction device exposed to varying pressures.

The first order effect of variations in the pressure acting on the junction of the tunnel diode is to vary the value of the peak current $I_p$ without affecting the other tunnel diode parameters. This characteristic is shown in FIGURE 3 of the drawings which illustrates a tunnel diode characteristic operating at several different pressure levels. From the data shown in FIGURE 3 of the drawings, it can be demonstrated that the variation in peak current value $I_p$ with pressure can be represented as an equation as set forth below:

$$I_p = I_{p0} e^{\alpha(P - P_0)} \quad (4)$$

where:

$I_p$ is the peak current at any pressure P.
$I_{p0}$ is the peak current at reference pressure $P_0$.
$\alpha$ is a pressure sensitivity coefficient.

By substituting Equation 4 into Equations 2 and 3, the following expressions can be derived:

$$t_1 = \frac{L}{R_L + \left(\frac{0.75 V_p}{I_{p0} e^{\alpha(P - P_0)}}\right)} \ln \left[ \frac{E_s - \left(R_L + \frac{0.75 V_p}{I_{p0} e^{\alpha(P - P_0)}} I_v\right)}{E_s - \left(R_L + \frac{0.75 V_p}{I_{p0} e^{\alpha(P - P_0)}}\right) I_{p0} e^{\alpha(P - P_0)}} \right] \quad (5)$$

and $$t_2 = \frac{L}{R_L + \frac{V_{fp} - V_v}{2(I_{p0} e^{\alpha(P - P_0)} - I_v)}} \ln \left[ \frac{V_{fp} + R_L I_{p0} e^{\alpha(P - P_0)} - E_s}{\left(\frac{V_{fp} + V_v}{2}\right) + I_v R_L - E_s} \right] \quad (6)$$

Figure 4:
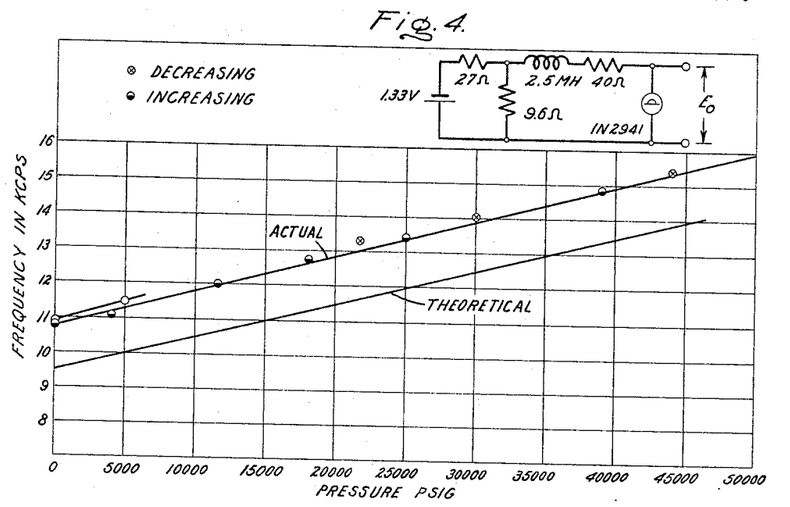
FIGURE 4 is a characteristic curve of the frequency versus pressure change of the physical characteristic sensing and measuring circuit shown in FIGURE 1.

From an examination of Equations 5 and 6, considered in conjunction with Equation 1, it can be appreciated that the oscillation period, and hence frequency, of the relaxation oscillator means 15 is primarily a function of the tunnel diode characteristics, the circuit parameters of the resistance-reactance circuit, the bias voltage level, and the pressure acting on the junction of the tunnel diode. FIGURE 4 of the drawings is a plot of the theoretical output frequencies obtained with a relaxation oscillator and tunnel diode having the circuit parameters indicated by the circuit diagram at the upper righthand corner of the figure. This curve of theoretical output frequencies is plotted against variations in pressure as the abscissa, and is shown on the lower curve illustrated. The upper curve is an actual plot of frequency change versus variations in pressure obtained with the circuit illustrated, and confirms precisely the extreme linearity predicted by the theoretical expressions.

It is noted in FIGURE 4, however, that there is a difference between the empirical values obtained, and the theoretically predicted values. This difference in values is explained primarily by uncertainties arising in the value of the energizing or bias voltage level $E_s$. This is particularly true for low bias voltage values. Because of this interdependence, it makes it difficult to separate the tunnel diode pressure-frequency sensitivity from the effects of undesired bias voltage variations on the relaxation oscillator frequency as illustrated by FIGURE 4. In addition to the bias voltage variation, there is another factor which affects the pressure-frequency sensitivity of the relaxation oscillator means, and that is the sensitivity of the relaxation oscillator to variations in the tunnel diode characteristic with temperature. Temperature changes acting directly on the junction of the tunnel diode device can cause frequency changes in the same manner as pressure variations cause such changes. This change in frequency of the relaxation oscillator with changes in temperature, further complicates the measurement of pressure with the tunnel diode sensing device 11. Accordingly, it can be appreciated that in undertaking to measure pressure changes by measurement of the pressure-frequency sensitivity of the relaxation oscillator means 15, it is important to assure that the value of the bias or energizing voltage $E_s$ is invariant, and that variations due to changes in temperature of the junction of the tunnel diode sensing device 11 are minimized, or where possible, compensated. In this manner, frequency shifts due to changes other than changes in the physical characteristic desired to be measured, can be avoided. The manner in which the relaxation oscillator means 15 can be adjusted in its operating characteristic to minimize the effects of changes in bias voltage level, and changes due to variations in temperature, and hence provide a reliable indication of pressure, will be discussed more fully hereinafter in connection with FIGURE 10 and FIGURE 5 of the drawings.

Figure 6:
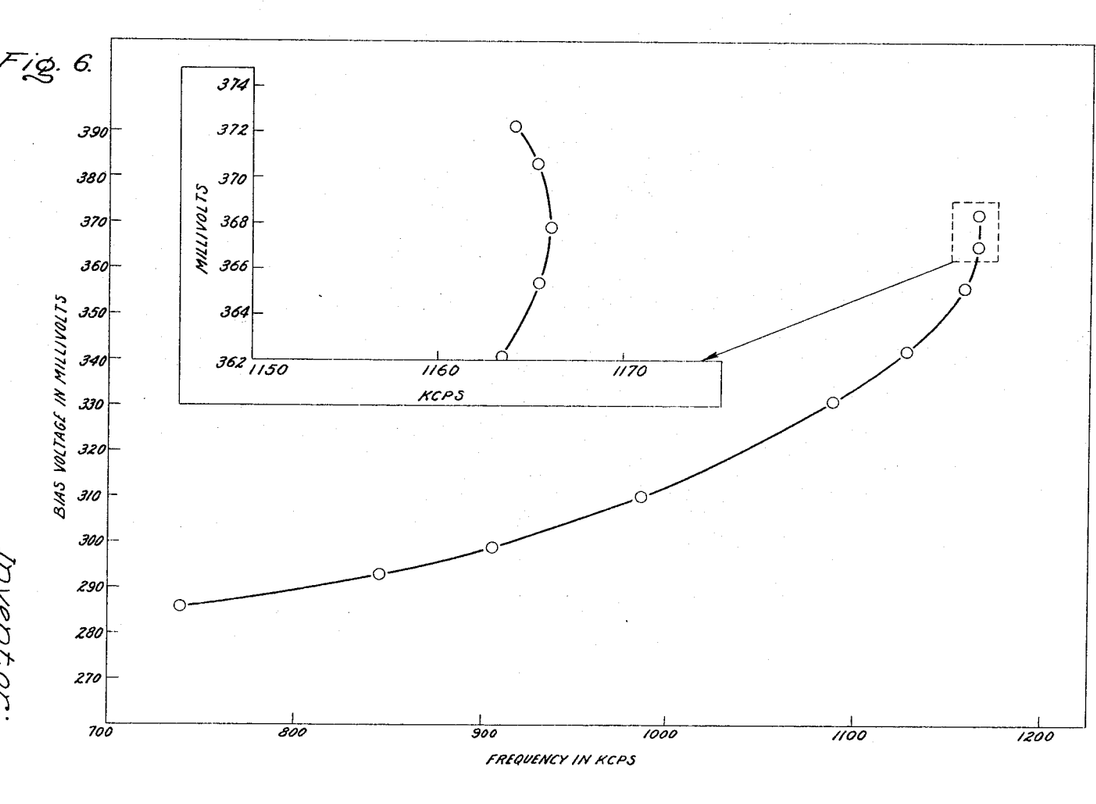
FIGURE 6 is a bias voltage versus frequency characteristic curve of the sensing and measuring circuit arrangement shown in FIGURE 1.

The manner in which variations in the bias voltage or energizing voltage level $E_s$ affects the frequency response to the relaxation oscillator means is shown in FIGURE 6 of the drawings. FIGURE 6 is a plot of the variation in frequency of the relaxation oscillator in response to variations in the bias voltage level. This characteristic is important because when the tunnel diode itself constitutes the physical characteristic sensing device of the arrangement, then any change in bias voltage level will represent an interference which must be minimized. As will be shown later in connection with FIGURE 8 of the drawings, this can be done by appropriate selection of the bias voltage value. With respect to FIGURE 6 however, it can be appreciated from an examination of FIGURE 6 that if the bias or energizing voltage $E_s$ is varied, then the frequency of the output signal developed by the relaxation oscillator means will vary as a function of the bias voltage level. This observation is confirmed in theory from an examination of Equations 2 and 3 wherein it can be seen that if the pressure is held constant, and the bias voltage $E_s$ is varied, then the period or frequency of oscillation will vary as a function of the variation of $E_s$. This characteristic, makes available a method for transducing a variation in a low voltage signal into a frequency modulated output signal by operating the relaxation oscillator means in a somewhat different mode than that portrayed in FIGURE 1 of the drawings.

Figure 7:
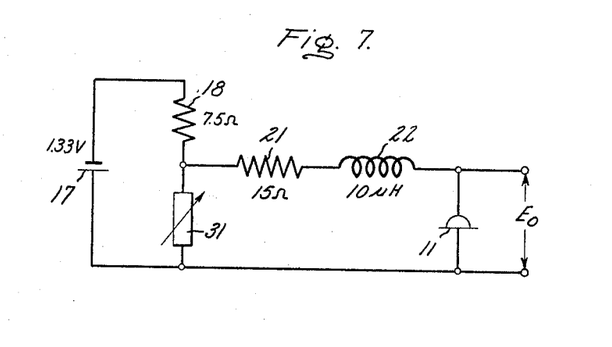
FIGURE 7 is a schematic circuit diagram of a modified measuring circuit constructed in accordance with the invention which takes advantage of the characteristic illustrated in FIGURE 6.

A relaxation oscillator circuit is illustrated in FIGURE 7 of the drawings which has been modified to take advantage of bias voltage variations, and wherein parts of the circuit which correspond to similar parts in the FIGURE 1 circuit are given the same reference numeral. The relaxation oscillator circuit means shown in FIGURE 7 includes a tunnel diode device 11 connected in electrical circuit relationship with a source of energizing potential 17 and a resistance-reactance circuit means comprised by the resistors 18, 21, and 31, and the inductor 22. The circuit in FIGURE 7 differs from the FIGURE 1 circuit, however, in that in place of the fixed resistance 19 used in FIGURE 1, a variable resistance 31 is employed. This variable resistance 31 may comprise a thermistor, that is, a temperature sensitive resistor, or some other variable resistor whose value of resistance varies in accordance with variations in the physical characteristic to be measured. As a consequence of this arrangement, the bias voltage or energizing voltage supplied to the tunnel diode 11 will vary in accordance with the temperature or physical characteristic being measured so as to cause the output frequency of the relaxation oscillator means to vary in accordance with such bias voltage level variation in the manner shown in FIGURE 6 of the drawings. It should be noted that where the relaxation oscillator circuit means is operated in the mode illustrated in FIGURE 7, its output frequency will be dependent upon any input variable which can be made to affect a change in the bias voltage value. This could be achieved by either a direct change in the value of the energizing or bias voltage 17, or by changes in the value of the resistance 31 as shown. In either eventuality, the change in the value of the energizing or bias voltage $E_s$ with the physical characteristic being measured, would alter the output frequency of the relaxation oscillator means in response to such change in the physical characteristic being measured.

Figure 8:
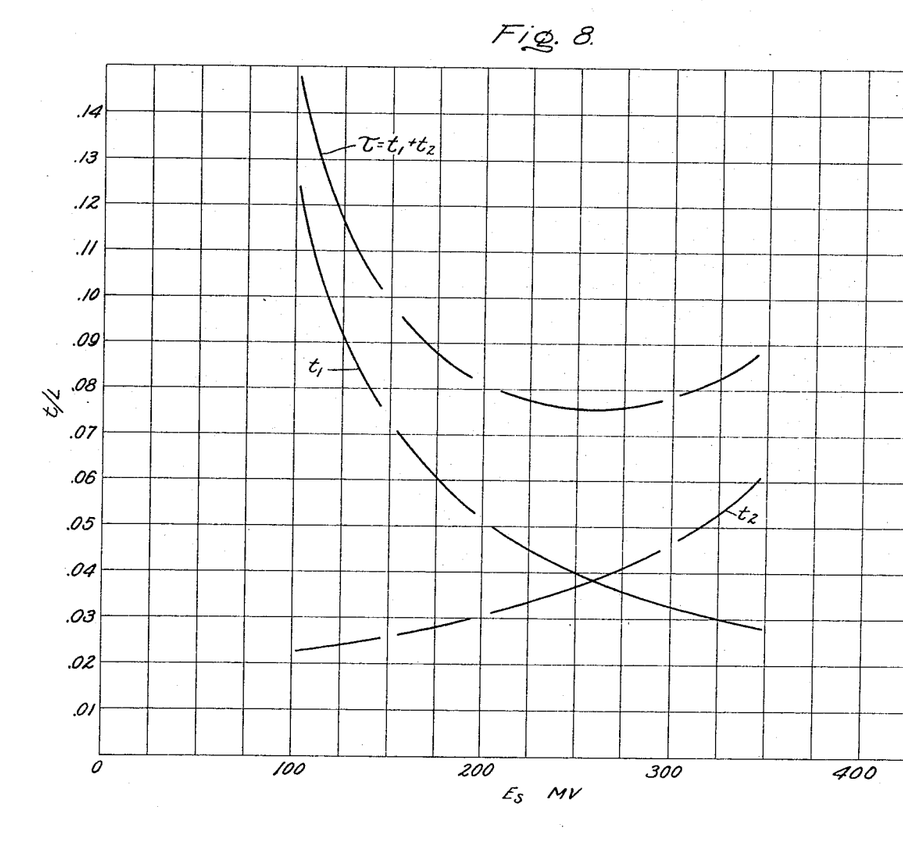
FIGURE 8 is a characteristic curve illustrating the variation in in the period of oscillation of the circuit shown in FIGURE 1 as a function of the bias voltage.

In contrast to the above described arrangement, where the tunnel diode 11 itself is the physical characteristic sensor, as in the arrangement shown in FIGURE 1 of the drawings, then any change in the energizing or bias voltage level $E_s$ represents an interference which must be minimized. This can be done by appropriate selection of the bias voltage value $E_s$ as best shown in FIGURE 8 of the drawings. FIGURE 8 is a characteristic curve which shows the variation in period of oscillation (and hence frequency) of the relaxation oscillator circuit means of FIGURE 1 plotted against variations in value of the bias voltage $E_s$. From an examination of FIGURE 8, it can be seen that there is a value of bias voltage $E_s$ equal to approximately 260 millivolts which gives a minimum period (and hence maximum frequency) at which variations in the bias voltage do not affect the output frequency. Hence, where the circuit is adjusted to operate at this point on its characteristic curve, the bias voltage variation-frequency sensitivity of the relaxation oscillator is reduced substantially to zero. This characteristic permits the relaxation oscillator means to be operated in a manner so that it is either very sensitive, or quite insensitive to bias voltage variations by proper selection of the bias voltage value. This characteristic (that is, minimum bias voltage-frequency sensitivity) is also illustrated for the arrangement whose characteristic is plotted in FIGURE 6 of the drawings. In FIGURE 6, it can be seen that at a bias voltage value of approximately 368 millivolts, variations in the bias voltage between the values of 365 millivolts to 371 millivolts, do not substantially affect the output signal frequency of the particular relaxation oscillator means there portrayed.

Figure 9:
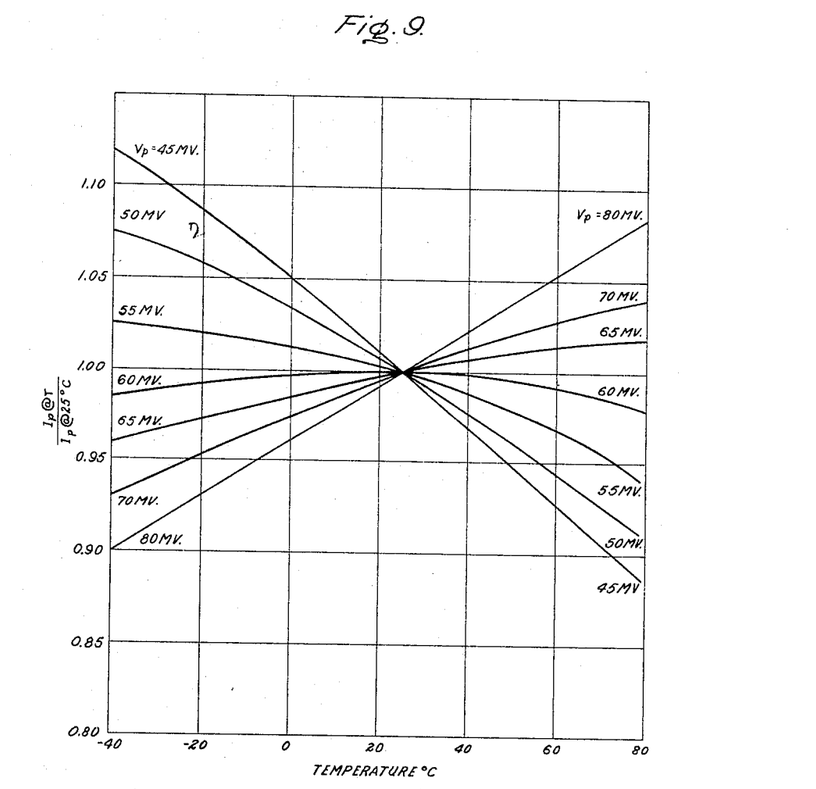
FIGURE 9 of the drawings is a characteristic curve showing the variation in temperature sensitivity of the tunnel diode with changes in peak voltage, a parameter indicative of the impurity level in the semiconductor material.

In the preceding discussion, the effect of temperature on the tunnel diode characteristics was considered to be constant. Where in any particular environment, this assumption would not be true, then it is necessary to consider the effect of changes in temperature on the tunnel diode characteristics, and hence on the frequency of the output signal developed by the relaxation oscillator means employing such tunnel diode. The temperature sensitivity of a tunnel diode is the composite result of the temperature sensitivity of the tunneling current region of the diode, and the temperature sensitivity of the conventional forward biased diode region of the tunnel diode characteristic as shown in FIGURE 2. The first of these is related to the tunnel diode construction (that is, the level of doping), and can be varied over a considerable range from positive coefficients through zero to negative coefficients. FIGURE 9 of the drawings shows the variation of the normalized peak current values $I_p$ with changes in temperature of a number of germanium tunnel diodes. As stated earlier, the temperature sensitivity of the peak current $I_p$ is related to the doping level of the tunnel diode, and can be varied as shown in FIGURE 9 from high positive values through zero to high negative values. Thus, by control of the doping level during manufacture of the tunnel diode device, a selection of any desired temperature coefficient in the range of $\pm\frac{1}{4}\%$ per °C. can be provided. In addition to this, however, it should be noted that the part of the tunnel diode characteristic curve labeled conventional forward biased diode shown in FIGURE 2, is also affected by temperature. This effect also must be considered in analyzing the temperature sensitivity of a relaxation oscillator means employing such a tunnel diode.

Upon analysis, it turns out that there are two specific combinations of tunnel diode temperature sensitivity characteristics which are of particular value. In the first case, the tunnel diode will have a slightly positive peak current temperature coefficient, and a pronounced positive temperature coefficient in the forward biased diode region. In the second case, the tunnel diode will have a pronounced negative peak current temperature coefficient, and a pronounced positive temperature coefficient in its forward biased diode region. In the following, examples of each are considered under the labels germanium diodes V and Z respectively. Referring back to Equation 1, it can be seen that the period of oscillation, and hence frequency of the output signal of the relaxation oscillator means is dependent upon the values $t_1$ and $t_2$. From a consideration of Equation 2, it can be seen that the effect of changes in temperature on the value $t_1$ is due only to changes in the peak current $I_p$ with changes in temperature. For a consideration of Equation 3, it can be seen that the predominant temperature effect here is due to changes on the value of the voltage $V_{fp}$ and $V_v$ with changes in temperature. Since the temperature induced changes in the value $t_1$ and $t_2$ are independent, it follows that a positive change in one (for example, $t_2$) can be offset by a negative change in the other ($t_1$) so that under certain bias voltage conditions, the net change in period or frequency with temperature is zero.

Figure 10:
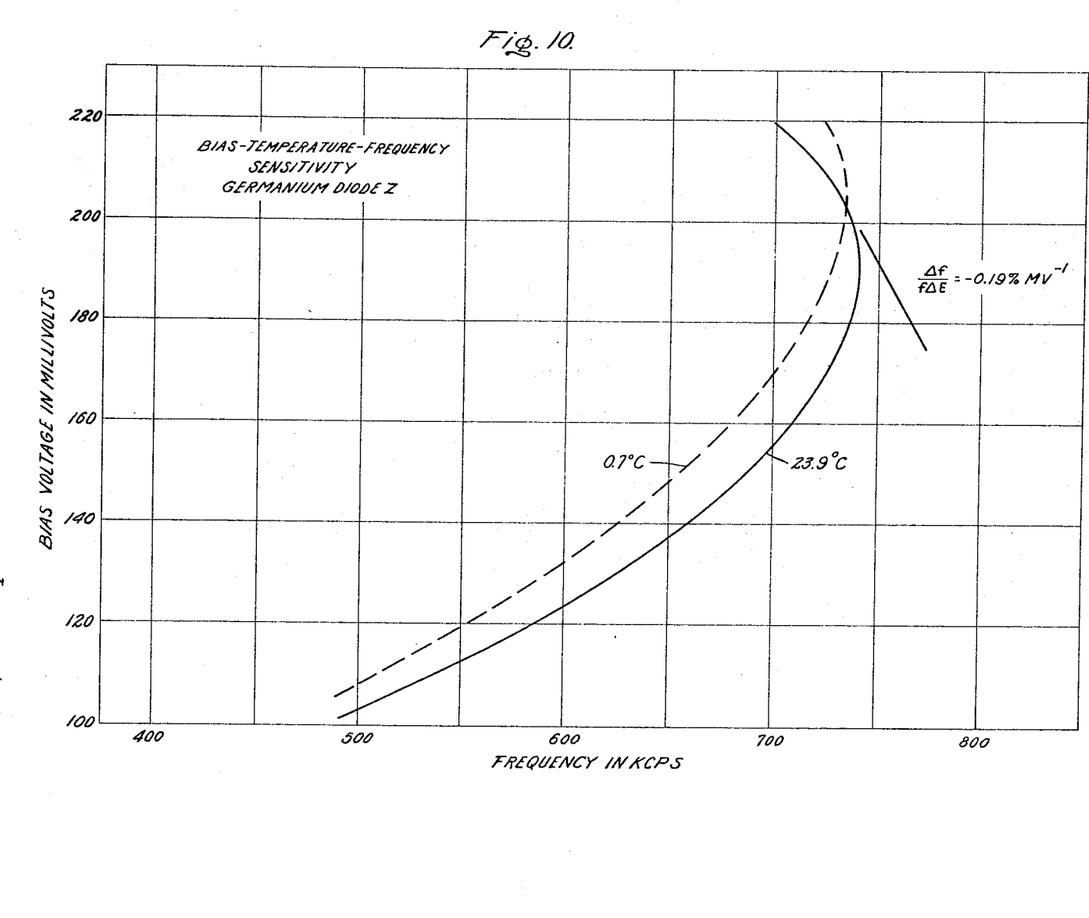
FIGURE 10 is a characteristic curve illustrating the bias - temperature - frequency sensitivity of the circuit shown in FIGURE 1.
Figure 11:
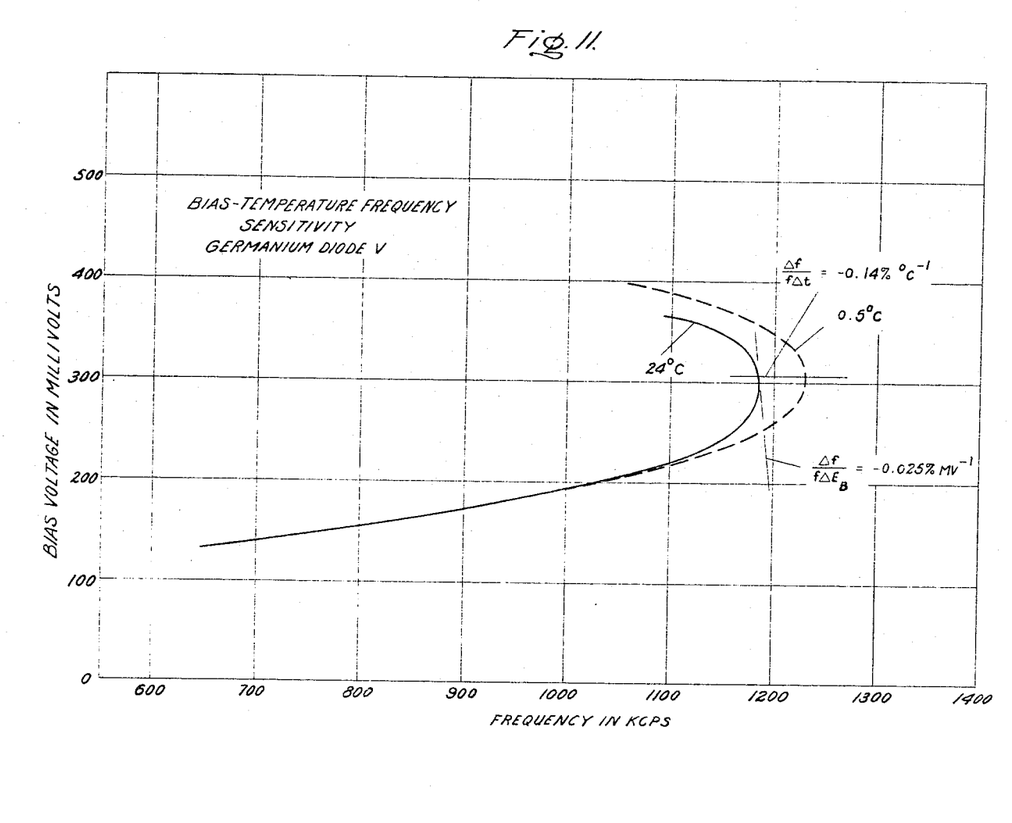
FIGURE 11 is a characteristic curve illustrating the bias-temperature-frequency sensitivity of the circuit arrangement shown in FIGURE 1 when employing a different tunnel diode device from that employed in obtaining the characteristic shown in FIGURE 10.

The above considerations have been verified experimentally as shown in FIGURES 10 and 11 of the drawings. In FIGURE 10, the frequency of the output signal from a relaxation oscillator means is plotted against the variations in bias voltage for a relaxation oscillator employing a germanium diode Z operated at two different temperatures .7° C. and 23.9° C. From a consideration of FIGURE 10, it can be seen that at a bias voltage level of about 205 millivolts, the germanium diode Z was insensitive to temperature, and only slightly sensitive to bias voltage variations. This makes a desirable combination for a pressure sensor. FIGURE 11 of the drawings shows the corresponding data for a relaxation oscillator employing the germanium tunnel diode V operated .5° C. and at 24° C. It can be noted from an examination of FIGURE 11 that at a bias voltage level in the region of 310 millivolts, the tunnel diode V exhibits considerable temperature sensitivity while substantially insensitive to bias voltage variations. Accordingly, this diode arrangement exhibits a desirable combination for a temperature sensor. Further, it might be noted that at bias voltage levels at about 150 millivolts in FIGURE 11, the relaxation oscillator employing tunnel diode V shows considerable energizing or bias voltage sensitivity while it is very insensitive to changes in temperature thereby making a desirable combination for a bias voltage sensor to be used in a circuit such as that shown in FIGURE 7 of the drawings. Accordingly, it appears that by properly choosing the tunnel diode's peak current temperature coefficient, and then suitably biasing the relaxation oscillator means, either a pressure, temperature, or voltage sensor having minimum interference can be devised.

The behavior described above suggests that some tunnel diode types are better adapted for sensing physical characteristics such as pressure, while others would be more suitable for sensing physical characteristics such as voltage and temperature. As regards a pressure sensor, it is desirable that the temperature-frequency sensitivity be very low in the region of maximum frequency where there is minimum bias voltage-frequency sensitivity. With such a pressure sensor, interference from variations in temperature an bias voltage would be minimized. Therefore, a tunnel diode having a characteristic such as is shown in FIGURE 10 of the drawings when employed in a relaxation oscillator, would be most satisfactory for use as a pressure sensing device. If the operating conditions are such that the existence of a constant temperature environment is assured, then biasing the relaxation oscillator of FIGURE 10 to operate at near maximum frequency will be sufficient to reduce bias voltage frequency sensitivity to a low level. However, where the relaxation oscillator must operate in an environment in which there may be an ambient temperature span, it is then necessary to restrict the bias voltage variations more stringently to stay within a given interference error band. For example, from FIGURE 10, it can be seen that at constant temperature a variation in the bias voltage of ±5 mv. about the maximum frequency point would cause a frequency shift of only about ±.07%. However, if the circuit is used where there is an ambient temperature span of say 23° C., then an .8% frequency change will result from the same ±5 mv. bias voltage variation. If the situation demands it, there are additional refinements which can be employed to further restrict this effect. One such refinement would be to employ a temperature compensation scheme wherein a temperature sensitive compensating resistor is used to vary the bias voltage value to compensate for changes in temperature. Such a temperature compensating resistor is shown by the dotted lines at 32 in FIGURE 1 as being connected in parallel circuit relationship with the tunnel diode device 11, and is physically located in the same temperature environment as the tunnel diode 11. If desired, other similar compensating schemes could be employed.

Figure 5:
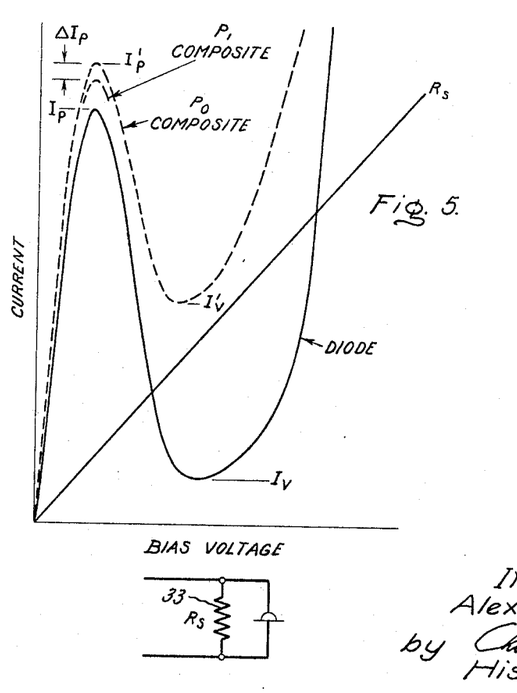
FIGURE 5 is a modified characteristic curve of the tunnel diode shown in FIGURE 1 illustrating its bias voltage versus current characteristic when a small shunting resistor (illustrated by the dotted resistor 32 in FIGURE 1) is connected across the tunnel diode.

Another refinement such as the one suggested in the preceding paragraph, is a technique for increasing the pressure sensitivity of the relaxation oscillator. This increase in pressure sensitivity is achieved by shunting the tunnel diode 11 of the circuit shown in FIGURE 1 with a resistor 33 connected in parallel circuit relationship with the tunnel diode 11. For convenience, the resistor 33 shown in FIGURE 1 is in dotted form only in order to illustrate that it is an alternative circuit arrangement. FIGURE 5 of the drawings shows the effect of the shunting resistor 33 on the tunnel diode characteristic. As long as the shunting resistor 33 is greater than the negative resistance of the tunnel diode, the net effect is a composite with a decreased peak to valley ratio. The lower limit for the shunting resistor is the negative resistance of the tunnel diode. Below this value, the composite will no longer exhibit a tunnel diode characteristic, and hence oscillation of the circuit of FIGURE 1 would become impossible. If the tunnel diode with the shunting resistor 33 is subjected to a pressure change which changes the peak current value $I_p'$ by a change in peak current represented by $\Delta I_p$, the frequency sensitivity of the combination diode and shunting resistor should be proportional to the expression $$\frac{\Delta I_p}{I_p' - I_v'}$$

This value should increase as the value $(I_p' - I_v')$ decreases to the limit where $(I_p' - I_v')$ is greater than or equal to $\Delta I_p$ required for oscillation of the circuit. Thus, an increase in sensitivity of the combination by a factor of approximately 8 is achieved over the use of the tunnel diode alone since a typical peak to valley current ratio for most germanium diodes is a value of about 9:1. This technique of pressure sensitivity improvement has been checked out experimentally, and the results indicated a threefold increase in sensitivity can be achieved without in any way affecting the linearity of the system.

As shown in FIGURE 11 of the drawings, the maximum temperature sensitivity of the relaxation oscillator means occurs in the region when there is a maximum bias voltage, and decreases toward zero as the bias voltage is decreased to a value in the neighborhood of 200 mv. Thereafter, with decreasing values of bias voltage $E_s$, the temperature sensitivity becomes slightly positive. This change is due mainly to variations in the value of the voltage $V_{fp}$ which affects the term $t_2$ of Equation 3. As the temperature increases, the value of voltage $V_{fp}$ decreases so that the value $t_2$ increases with a resultant decrease in output frequency since frequency is dependent upon the term $$f = \frac{1}{\tau}$$

In contrast to this characteristic, the germanium diode Z whose characteristic is shown in FIGURE 10 shows a more pronounced compensating effect from temperature variations in the value of the peak current $I_p$. Accordingly, it can be appreciated that at high bias voltage values, the term $V_{fp}$ is controlling, and the frequency will have a negative coefficient as with the diode V shown in FIGURE 11. However, at low values of bias voltage, the peak current $I_p$ will be controlling, and a positive temperature coefficient of frequency will result as with diode Z in FIGURE 10. As stated earlier, the behavior described above suggests that some diode types are better adapted to sensing voltage and temperature whereas others are more suitable for pressure sensing. A tunnel diode having a characteristic such as that shown in FIGURE 11 lends itself primarily to temperature sensing when biased to maximum frequency (that is, to minimum bias voltage sensitivity), and to voltage sensing when biased for minimum temperature sensitivity. From the preceding discussion, it can therefore be appreciated that the circuit of FIGURE 1, when used with the tunnel diode V, and biased to a value in the neighborhood of 305 millivolts as shown in the characteristic curve on FIGURE 11, will be suitable for use as a temperature sensing arrangement. For such uses, it is anticipated that the tunnel diode itself will be exposed to the effect of temperature, and it is preferred that the temperature changes act directly on the junction of the tunnel diode.

The temperature sensitivity of the relaxation oscillator means when adjusted in the manner described in the preceding paragraph, to measure temperature changes, can be increased somewhat by an arrangement whereby the temperature being sensed also controls the hydrostatic pressure on the tunnel diode 11. In such an arrangement, one would make use of the tunnel diode's pressure sensitivity as well as its temperature sensitivity. For this purpose, the housing 12 would have to be a rigid closed container which is completely filled with a liquid, which, when the temperature of the liquid is raised, increases the internal pressure acting on the junction of the tunnel diode as the fluid attempts to expand against the restraint of the rigid container. Neglecting possible volume changes in the container, the pressure change with change in temperature would be given by the expression $$\frac{\Delta p}{\Delta t} = \frac{\alpha}{\beta}$$

where $\alpha$ is the volume coefficient of expansion of the liquid, and $\beta$ is its compressibility. The magnitude of the effect using three different liquids for this purpose, is set forth in the following table.

Table 1 below gives $\Delta p/\Delta t$ for several liquids.

TABLE 1

| Liquid | Temperature, °C. | $\alpha \times 10^3$ °C.$^{-1}$ | $\beta \times 10^6$ Atm.$^{-1}$ | $\Delta p/\Delta t$ Atm. °C.$^{-1}$ |
|---|---|---|---|---|
| Ether | 20 | 1.66 | 188 | 8.8 |
| Water | 20 | 0.21 | 49 | 4.3 |
| Mercury | 20 | 0.18 | 3.95 | 45.5 |

A typical tunnel diode which could be used in such an arrangement has a pressure sensitivity of about .015% change in $I_p$ per atmosphere, and a temperature sensitivity of about .4% change in $I_p$ per degree centigrade. If such a diode was arranged to sense both pressure and temperature of the fluid in a closed volume, its sensitivity to temperature would be (for mercury):

$$\frac{\Delta f}{\Delta t} = 0.4 + 45.5(0.015) = 1.08\% \,°C.^{-1}$$

This constitutes an increase in temperature sensitivity of approximately 2.5 times. It is to be noted also that while an increase in sensitivity is gained with the particular diode in question whose values are shown in Table I, a greater sensitivity would result with a diode having a greater pressure sensitivity.

Figure 12:
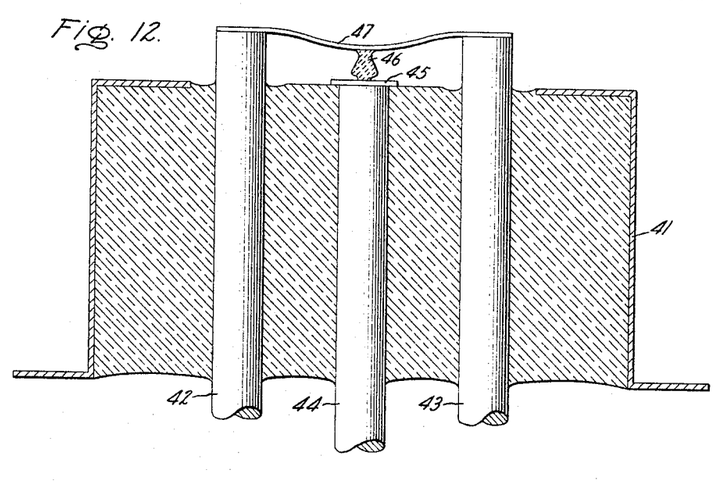
FIGURE 12 is a cross sectional view of a tunnel diode device showing the conventional manner of fabrication and mounting the junction thereof.
Figure 13:
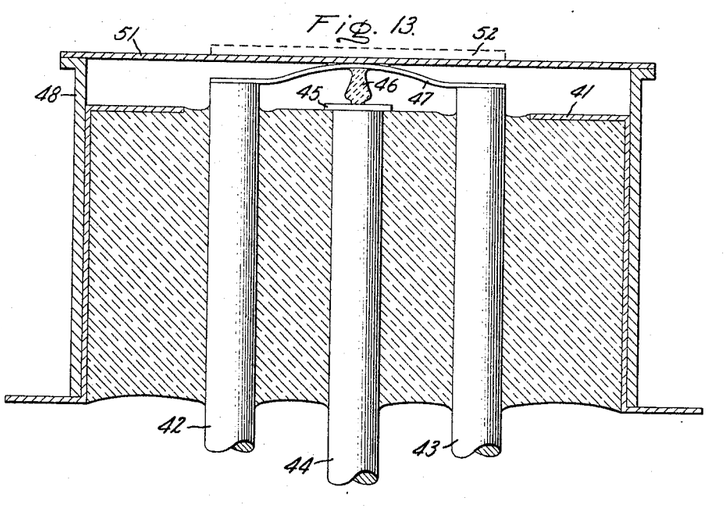
FIGURE 13 is a cross sectional view of a new and improved tunnel diode sensing device fabricated in accordance with the teachings of the present invention.

From the foregoing description, it can be appreciated that the new and improved tunnel diode sensing device and arrangement lends itself readily for use as a physical characteristic measuring device. To be particular, it is anticipated that the device when included in a relaxation oscillator arrangement can be readily used to measure changes in pressure, temperature and voltage. Additionally, by proper modification of the junction, it is possible to utilize the junction's sensitivity to a uniaxial stress to sense force, acceleration, and similar physical characteristics. One suitable modification of a tunnel diode construction rendering it susceptible for use as a pressure transducer, a force sensing device, a hydrophone, or a microphone, is illustrated in FIGURE 13 of the drawings. With respect to FIGURE 13, however, it is first necessary to consider the fabrication of a conventional tunnel diode as shown in FIGURE 12 of the drawings which discloses prior art practice as indicated by the drawings. The tunnel diode shown in FIGURE 12 is comprised by an outer housing or case 41. Two outer electrically conductive rods 42 and 43 are supported within the case 41 by a suitable electrically insulating potting compound which may comprise glass, a synthetic plastic, or some other suitable material which provides electrical insulating qualities as well as rigid mechanical support for the electrically conducting rods 42 and 43. A third electrically conducting rod or wire 44 is supported between the two rods 42 and 43 and has a base plate of a suitably doped semiconductor material 45 such as an n-type germanium secured to the end thereof. To this is soldered a dot of p-type semiconductor material which after etching to form the junction appears as shown at 46. The tunnel diode junction is the necked down area between 45 and 46. One contact to the junction is made via rod 44 and a second electrical contact is formed by a slack aluminum ribbon 47 secured between the two conductive rods or wires 42 and 43 and having its central portion attached to and electrically connected to the semiconductor dot 46. This junction, in order for the tunnel diode device to function properly and exhibit desired tunnel diode characteristics, is fabricated with extreme care. In such fabrication, to control the size of the junction, it is selectively etched at the interface to obtain the desired current density through the junction. For example, some very high current density diode units (having current densities in the order of $10^5$ amperes/cm.$^2$) have junction radii of approximately 2 microns after etching.

If the construction of the tunnel diode device shown in FIGURE 12 is modified in the manner shown in FIGURE 13 so that the electrically conductive slack aluminum ribbon 47 is arched as shown in FIGURE 13, then the ribbon 47 forms a high spot which permits the junction to be axially loaded by an applied force generated by means of a slack diaphragm 51 bonded to the high spot of the ribbon. The slack diaphragm 51 may be circular in configuration, and secured to a cylindrical exterior housing member 48 that is secured around the outer casing 41 of the tunnel diode. Upon being thus modified, pressure applied to the slack diaphragm 51 will be magnified many times with respect to its effect on the junction of the tunnel diode. That is to say that the pressure applied to the junction would be orders of magnitude higher than that acting on the diaphragm, and would cause measurable changes in the electrical properties of the diode. These measurable changes may be estimated in the following manner.

If in the modified tunnel diode construction of FIGURE 13, a slack diaphragm of radius ($r_D$) is supported at its perimeter and at its center, the load on the center support ($F_c$) is given by the expression:

$$F_c = \Delta p_D r_D^2 \qquad (8)$$

The ratio of the pressure across the flat diaphragm (given by the term $\Delta p_D$) to the pressure applied to the junction of the tunnel diode (given by the term $\Delta p_j$) is:

$$\Delta p_j / \Delta p_D = \frac{F_c / \pi r_j^2}{\Delta p_D} = \frac{\Delta p_D r_D^2 / \pi r_j^2}{\Delta p_D} = \frac{r_D^2}{\pi r_j^2}$$

(9)

Assuming now that for the construction shown in FIGURE 13 a junction diameter of 2 microns is employed and a slack diaphragm having a radius $r_D = 0.10''$ or 0.25 cm. is used, then by substitution in Equation 9, the ratio $$\frac{\Delta p_j}{\Delta p_D} = \frac{(0.25)^2}{\pi (2 \times 10^{-4})^2} = 0.5 \times 10^6$$

If a germanium tunnel diode is operated at constant current in the region near its peak current, the variation in voltage for a variation in junction pressure is given by the expression.

$$\frac{\Delta E}{E \Delta p_j} = 0.83 \text{ kp.s.i.}^{-1} = 1.3 \times 10^{-8} \%/\mu\text{bar}$$

Assuming the diaphragm arrangement set forth in the above example, then the voltage sensitivity of such a diaphragm arrangement would be given by the expression:

$$\frac{\Delta E}{\Delta p_D} = 1.3 \times 10^{-10} E (0.5 \times 10^6)$$

With a typical value of bias voltage $E=60$ mv., then the expression would give:

$$\frac{\Delta E}{\Delta p_D} = 1.3 \times 10^{-10} (60)(0.5 \times 10^6) = 0.3 \times 10^{-2} \text{ mv.}/\mu\text{bar}$$

This value is about the same order of magnitude as some commercial miniature microphones presently available which are of comparable size. It should also be noted that greater sensitivity can be obtained with a larger diaphragm diameter, with the sensitivity increasing as the square of the diameter. It should also be noted that with some added circuit complexity, it would be possible to further increase the pressure sensitivity of such a modified tunnel diode construction by about 3 orders of magnitude with techniques such as shunting the tunnel diode with a resistor equal to the diode's negative resistance.

In addition to the possible utility of the modified diode construction shown in FIGURE 13 as a pressure transducer, a hydrophone, or microphone, or a direct force transducer, it should be noted that with the addition of some mass such as shown in dotted form at 52 in FIGURE 13 to the diaphragm, the structure could be employed as an accelerometer or as a seismographic pickup if connected in a relaxation oscillator means of the type disclosed in FIGURE 1 of the drawings.

From the foregoing description, it can be appreciated that the present invention provides a new and improved physical characteristic sensing device and arrangement which can be readily adapted to measure physical characteristics such as pressure, force, temperature, acceleration and the like. This arrangement by its nature and operation directly develops a frequency modulated output signal which by proper calibration may be readily used not only to indicate the change in the physical characteristic being sensed, but can be used to provide a measure of the magnitude of the change in the physical characteristic. For this reason, the invention provides a highly reliable tool for sensing and measuring the variations in physical characteristics. By reason of the fact that the arrangement develops a frequency modulated output signal, and such a signal is not readily degraded by such transients as background noise, the arrangement is particularly well adapted for use in telemetering equipment and the like.

While in the foregoing description applicant has described several specific embodiments of his invention, it is believed apparent that in the light of the above teachings, other modifications and variations of the invention will be suggested to those skilled in the art. Therefore, it should be expressly understood that the invention is in no way limited to the specific embodiments disclosed, but is defined by the appended claims.

What I claim as new and desire to secure by Letters Patent of the United States is:

1. A physical characteristic sensing and measuring arrangement comprising a tunnel diode junction device having substantially no hysteresis effects and fabricated to expose the junction of the device to the effect of the physical characteristic to be sensed, a source of energizing potential, resistance-reactance circuit means operatively coupled in electric circuit relationship with said tunnel diode and said energizing means to form a relaxation oscillator means, and output means operatively coupled to said relaxation oscillator means for deriving an output indication of the variations in response of said relaxation oscillator means to the physical characteristic being sensed.

2. The combination set forth in claim 1 further characterized by a resistor connected in parallel circuit relationship with the tunnel diode device.

3. The combination set forth in claim 1 wherein the relaxation oscillator means is disposed within a shielded container and is located in the environment of the physical characteristic being sensed along with the tunnel diode device.

4. The combination set forth in claim 1 wherein the value of the energizing potential is adjusted to a value determined by the tunnel diode characteristic to maximize the frequency change of the relaxation oscillator means output in response to a change in the physical characteristic being sensed, and to minimize effect of changes in the energizing potential on the relaxation oscillator means output.

5. The combination set forth in claim 1 wherein the physical characteristic to be sensed is temperature, and wherein the value of the energizing potential is adjusted to a value determined by the tunnel diode characteristic to maximize the frequency change of the relaxation oscillator means output in response to a change in temperature, and to minimize the effects of changes in the energizing potential and changes in pressure on the relaxation oscillator means output.

6. The combination set forth in claim 5 further characterized by a rigid fluid tight container and wherein said tunnel diode device is disposed within a fluid in said container whereby changes in temperature affect said tunnel diode directly and increase the pressure of the fluid within the container to produce a complimentary temperature caused effect which adds to and increases the directly caused temperature effect.

7. The combination set forth in claim 1 wherein the physical characteristic to be sensed is pressure, and wherein the value of the energizing potential is adjusted to a value determined by the tunnel diode operating characteristic to maximize the frequency change of the relaxation oscillator means output in response to a change in pressure, and to minimize the effects of changes in the value of the energizing potential and changes in temperature on the relaxation oscillator means output.

8. The combination set forth in claim 7 further characterized by a resistor connected in parallel circuit relationship with the tunnel diode device.

References Cited by the Examiner
UNITED STATES PATENTS

| | | |
|---|---|---|
| 3,005,860 | 10/1961 | Bruck. |
| 3,050,684 | 8/1962 | Schar. |
| 3,083,319 | 3/1963 | Tiemann. |
| 3,134,949 | 5/1964 | Tiemann. |
| 3,158,027 | 11/1964 | Kibler _____________ 73—362 |
| 3,184,972 | 5/1965 | Sikorski ___________ 73—398 |

LOUIS R. PRINCE, *Primary Examiner.*

DAVID SCHONBERG, *Examiner.*

S. H. BAZERMAN, *Assistant Examiner.*